(12) United States Patent
Kuo et al.

(10) Patent No.: US 7,128,062 B2
(45) Date of Patent: Oct. 31, 2006

(54) METHOD FOR MID LOAD OPERATION OF AUTO-IGNITION COMBUSTION

(75) Inventors: Tang-Wei Kuo, Troy, MI (US); Paul M. Najt, Bloomfield Hills, MI (US); James A. Eng, Troy, MI (US); Junseok Chang, Ann Arbor, MI (US); Zoran S. Filipi, Ann Arbor, MI (US); Dionissios N. Assanis, Ann Arbor, MI (US); Orgun A. Guralp, Ann Arbor, MI (US)

(73) Assignees: General Motors Corporation, Detroit, MI (US); University of Michigan, Ann Arbor, MI (US)

(*) Notice: Subject to any disclaimer, the term of this patent is extended or adjusted under 35 U.S.C. 154(b) by 0 days.

(21) Appl. No.: 11/064,320

(22) Filed: Feb. 23, 2005

(65) Prior Publication Data

US 2006/0005818 A1 Jan. 12, 2006

Related U.S. Application Data

(60) Provisional application No. 60/587,120, filed on Jul. 12, 2004.

(51) Int. Cl.
*F02M 25/07* (2006.01)
*F02B 3/08* (2006.01)
*F02B 75/10* (2006.01)
*G06F 19/00* (2006.01)

(52) U.S. Cl. .................. 123/568.14; 123/302; 123/316

(58) Field of Classification Search ............. 123/58.8, 123/336, 184.54, 568.11, 568.13, 568.14, 123/316, 302, 90.11, 90.15, 90.1, 90.17; 701/108

See application file for complete search history.

(56) References Cited

U.S. PATENT DOCUMENTS 3,785,355 A * 1/1974 Toepel ...................... 123/316
3,799,130 A * 3/1974 Dahlstrom .............. 123/568.13
4,109,625 A * 8/1978 Kawamura et al. ..... 123/568.13
4,192,265 A * 3/1980 Amano et al. .............. 123/316
5,009,199 A * 4/1991 MacFarlane ........... 123/184.54
5,224,460 A * 7/1993 Havstad et al. ........ 123/568.14
5,303,686 A * 4/1994 Kanesaka .............. 123/568.14
6,009,861 A * 1/2000 Kreuter ................. 123/568.14

(Continued)

FOREIGN PATENT DOCUMENTS

WO 01/46571 A1 6/2001

(Continued)

*Primary Examiner*—Willis R. Wolfe, Jr.
(74) *Attorney, Agent, or Firm*—Kathryn A. Marra

(57) ABSTRACT

A method is disclosed for expanding the mid load range of a four-stroke gasoline direct-injection controlled auto-ignition combustion engine. The engine includes at least one cylinder containing a piston reciprocably connected with a crank and defining a variable volume combustion chamber including an intake valve controlling communication with an air intake and an exhaust valve controlling communication with an exhaust outlet. A system is employed for variably actuating the intake and exhaust valves. The valve actuating system is employable to operate the intake and exhaust valves with an exhaust re-compression or an exhaust re-breathing valve strategy. A reservoir chamber in communication with the combustion chamber is provided for temporary holding of residual burned gas. Residual burned gas in the combustion chamber and the exhaust outlet enters into the reservoir chamber and then loses thermal energy while in the reservoir chamber before being drawn back into the combustion chamber.

8 Claims, 12 Drawing Sheets

U.S. PATENT DOCUMENTS

| | | | |
|---|---|---|---|
| 6,202,626 B1 * | 3/2001 | Ito et al. | 123/336 |
| 6,321,731 B1 * | 11/2001 | Russ et al. | 123/568.14 |
| 6,328,003 B1 * | 12/2001 | Gaertner et al. | 123/58.8 |
| 6,405,706 B1 * | 6/2002 | Hammoud et al. | 123/316 |
| 6,739,295 B1 * | 5/2004 | Yamaoka et al. | 123/90.15 |
| 6,886,532 B1 * | 5/2005 | Nohara et al. | 123/90.16 |
| 6,964,270 B1 * | 11/2005 | Janssen et al. | 123/568.13 |
| 2003/0226528 A1 * | 12/2003 | Yamaoka et al. | 123/90.15 |
| 2004/0194746 A1 * | 10/2004 | Yamaoka et al. | 123/90.15 |
| 2005/0076890 A1 * | 4/2005 | Seitz et al. | 123/568.14 |

FOREIGN PATENT DOCUMENTS

WO 01/46573 A1 6/2001

* cited by examiner

Port Deactivation

Intake Valve Deactivation

METHOD FOR MID LOAD OPERATION OF AUTO-IGNITION COMBUSTION

CROSS-REFERENCE TO RELATED APPLICATIONS

This application claims priority from U.S. Provisional Patent Application No. 60/587,120 filed Jul. 12, 2004.

TECHNICAL FIELD

The present invention relates to a method for extending the mid load range of a gasoline direct-injection controlled auto-ignition combustion engine, and more particularly to the use of a port throttle as an alternative to external exhaust gas recirculation (EGR) to dissipate some of the thermal energy associated with the internal residuals needed for controlled auto-ignition combustion and charge dilution.

BACKGROUND OF THE INVENTION

To improve the thermal efficiency of gasoline internal combustion engines, dilute combustion, using either air or EGR, is known to give enhanced thermal efficiency and lower NOx emissions. There is, however, a limit at which an engine can be operated with a diluted mixture because of misfire and combustion instability as a result of a slow burn. Known methods to extend the dilution limit include: 1) improving ignitability of the mixture by enhancing ignition and fuel preparation; 2) increasing the flame speed by introducing charge motion and turbulence; and 3) operating the engine under controlled auto-ignition combustion.

The controlled auto-ignition process is sometimes called a Homogeneous Charge Compression Ignition (HCCI). In this process, a mixture of combusted gases, air, and fuel is created and auto-ignition is initiated simultaneously from many ignition sites within the mixture during compression, resulting in very stable power output and high thermal efficiency. The combustion is highly diluted and uniformly distributed throughout the charge. The burned gas temperature and hence NOx emissions are substantially lower than that of traditional spark ignition engines based on propagating flame front and diesel engines based on an attached diffusion flame. In both spark ignition and diesel engines, the burned gas temperature is highly heterogeneous within the mixture with very high local temperature creating high NOx emissions.

Engines operating under controlled auto-ignition combustion have been successfully demonstrated in two-stroke gasoline engines using a conventional compression ratio. It is believed that the high proportion of burned gases remaining from the previous cycle, i.e., the residual content, within the two-stroke engine combustion chamber is responsible for providing the high mixture temperature necessary to promote auto-ignition in a highly diluted mixture. In four-stroke engines with traditional valve means, the residual content is low, and controlled auto-ignition at part load is difficult to achieve. Known methods to induce controlled auto-ignition at low and part loads include: 1) intake air heating; 2) variable compression ratio; and 3) blending gasoline with ignition promoters to create a more easily ignitable mixture than gasoline. In all the above methods, the range of engine speeds and loads in which controlled auto-ignition combustion can be achieved is relatively narrow.

Engines operating under controlled auto-ignition combustion have been demonstrated in four-stroke gasoline engines using variable valve actuation with unconventional valve means. The following is a description of one such unconventional valve strategy. With this valve strategy, a high proportion of residual combustion products from previous combustion cycles is retained to provide the necessary condition for auto-ignition in a highly diluted mixture. The range of engine speeds and loads in which controlled auto-ignition combustion can be achieved is greatly expanded using a conventional compression ratio.

A method of operating a four-stroke internal combustion engine has been disclosed in which combustion is achieved at least partially by an auto-ignition process. Flow of pre-mixed fuel/air charge and combusted gases is regulated by hydraulically controlled valve means in order to generate conditions in the combustion chamber suitable for auto-ignition operation. The valve means used includes an intake valve controlling flow of premixed fuel/air mixture into the combustion chamber from an inlet passage and an exhaust valve controlling flow of exhaust combusted gases from the combustion chamber to an exhaust passage. The exhaust valve is opened for two separate periods during the same four-stroke cycle. The exhaust valve is opened for a first period to allow combusted gases to be expelled from the combustion chamber and for a second period to allow combusted gases previously exhausted from the combustion chamber to be drawn back into the combustion chamber. The double opening of the exhaust valve during each four-stroke cycle, creates the necessary condition for auto-ignition in the combustion chamber. This is generally referred to as an exhaust re-breathing valve strategy.

A method of operating a four-stroke internal combustion engine has also been disclosed in which combustion is achieved at least partially by an auto-ignition process. Flow of air and combusted gases are regulated by hydraulically controlled valve means as detailed above. The fuel, however, is delivered by a gasoline injector directly into the combustion chamber. The gasoline injector is said to inject fuel either during the intake stroke or the subsequent compression stroke during a single engine cycle.

In general, HCCI engine operation is limited by combustion stability at low engine load and by in-cylinder pressure rise or amplitude of pressure oscillation at a mid load limit. Too large a pressure rise or amplitude of pressure oscillation results in combustion generated noise called ringing. It has been found experimentally that both internally and externally recirculated burned gas is effective in controlling the combustion rate and hence the pressure rise. The present invention describes a method for regulating the thermal energy of the internally recirculated burned gas or internal residual as an alternative to external EGR for HCCI engine combustion control in the mid load range.

SUMMARY OF THE INVENTION

The present invention provides a method for extending the mid load range of a gasoline direct-injection controlled auto-ignition combustion engine. More specifically, a port throttle is used as an alternative to external exhaust gas recirculation (EGR) to dissipate some of the thermal energy associated with the internal residuals needed for controlled auto-ignition combustion and charge dilution. The port throttle is achieved by employing a flow control valve in one branch of the intake runners for a two-intake-valve per cylinder engine. The swirl control valve that is currently used in a stratified-charge gasoline direct-injection spark ignition engine for in-cylinder air motion control is used herein for example to demonstrate its effectiveness.

The present invention works for all valve strategies. For purposes of example, only results obtained using an exhaust re-breathing valve strategy as described above are presented herein. The injection strategy used is single fuel injection during the intake stroke. An overall lean in-cylinder fuel-air mixture is generated by controlling the proportion of fuel and air mass inducted into the cylinder. With this approach, the mid load operation limit is reached around 450 kPa NMEP using a conventional compression ratio as determined by either a pressure rise or an amplitude of pressure oscillation that exceeds a prescribed threshold value.

It is found experimentally that variation of the flow control valve setting or the degree of port throttle in one branch of the intake runners has a profound effect on combustion rate of controlled auto-ignition combustion engines. In particular, the peak burning rate decreases and burn duration increases with decreasing flow control valve setting from open to close. It is further experimentally demonstrated that the observed combustion rate decrease with port throttling is not caused by changes in the in-cylinder mixture motion, i.e. the mixing process, as originally speculated. In fact, both peak burning rate and burn duration are the same for the case without the port throttle and the case with the intake valve connecting to the throttled port deactivated.

One-dimensional gas dynamic modeling analyses revealed that, for the case with the flow control valve closed, a large portion of the total recirculated burned gas in the cylinder is drawn from the cooler throttled intake port (about 440 deg K gas temperature) instead of re-breathing fully from the hotter exhaust port (about 740 deg K gas temperature). This results in a lower mixture temperature at intake valve closing (IVC), hence retarded and slower HCCI combustion. The effectiveness of using a port throttle for thermal management of the recirculated burned gas varies depending on port throttle setting. The effect is the strongest when the flow control valve is fully closed.

With the present invention, the mid load range of a gasoline direct-injection controlled auto-ignition combustion engine is expanded by closing the flow control valve to take advantage of the maximum heat dissipation of the recirculated burned gas in the throttled intake port. In particular, the mid load range is increased by more than 5% to about 475 kPa NMEP using a conventional compression ratio with acceptable pressure rise or amplitude of pressure oscillation.

These and other features and advantages of the invention will be more fully understood from the following description of certain specific embodiments of the invention taken together with the accompanying drawings.

DESCRIPTION OF THE PREFERRED EMBODIMENT

For simplicity, the following description will address the present invention in its application to a single cylinder direct-injection gasoline four-stroke internal combustion engine, although it should be appreciated that the present invention is equally applicable to a multi-cylinder direct-injection or port-fuel-injected gasoline four-stroke internal combustion engine.

Figure 1A:
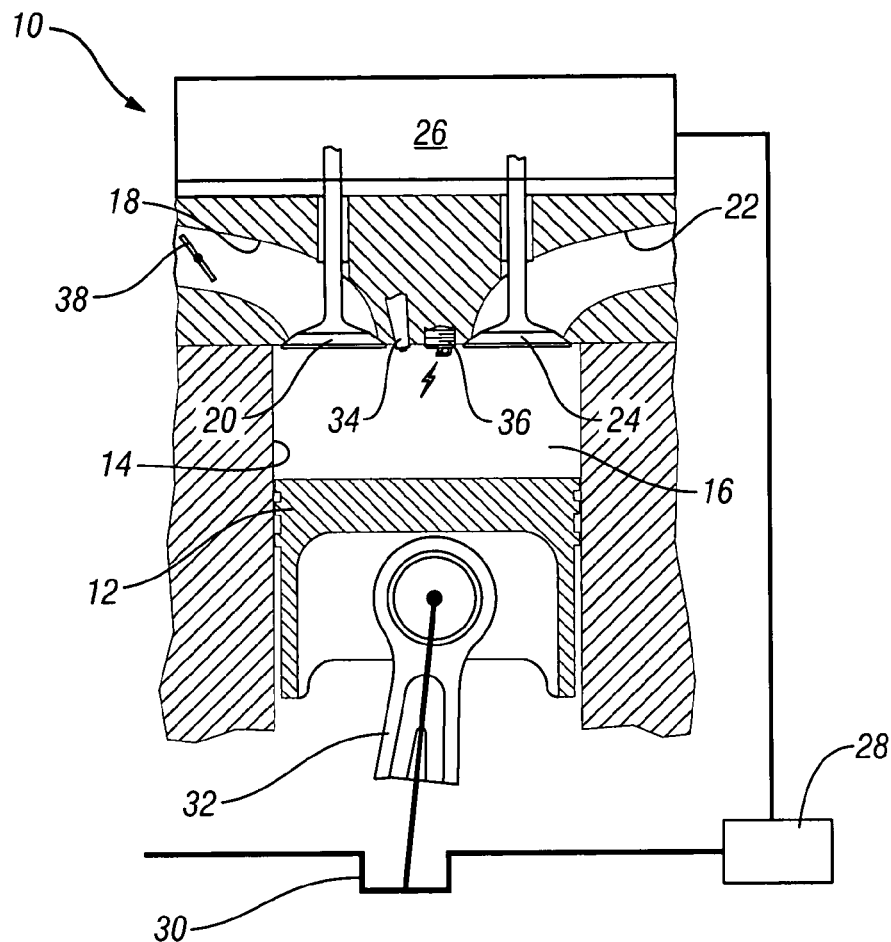
FIG. 1A is a schematic view of a single cylinder direct-injection gasoline four-stroke internal combustion engine according to the present invention.

A schematic representation of an embodiment of the present invention is a single-cylinder direct-injection four-stroke internal combustion engine 10 shown in FIG. 1A. In the Figure, a piston 12 is movable in a cylinder 14 and defines with the cylinder 14 a variable volume combustion chamber 16. An intake passage 18 supplies air into the combustion chamber 16. Flow of air into the combustion chamber 16 is controlled by intake valve 20. Combusted gases can flow from the combustion chamber 16 via an exhaust passage 22 and flow of combusted gases through the exhaust passage 22 is controlled by exhaust valve 24.

The engine 10 of the present invention as shown in FIG. 1A has a mechanical cam-actuated valve train 26 that controls the opening and closing of both the intake 20 and exhaust 24 valves. The valve train 26 is tied to the position of the engine 10, which is measured by a rotation sensor 28. The rotation sensor 28 is connected to a crankshaft 30 of the internal combustion engine 10. The crankshaft 30 is connected by a connecting rod 32 to the piston 12 reciprocate in the cylinder 14.

A gasoline direct injector 34, controlled by an electronic controller, is used to inject fuel directly into the combustion chamber 16. The present invention is insensitive to injector tip location. A spark plug 36, controlled also by an electronic controller, is used to enhance the ignition timing control of the engine 10 across the engine load range. While the simple engine 10 shown above does not need a spark plug 36 for operation under controlled auto-ignition combustion, it has proven desirable to use a spark plug to complement the auto-ignition process, particularly in start-up conditions. Also, it has proven desirable to rely on auto-ignition only in part-load/low speed operating conditions and to use spark ignition during high load/high speed operating conditions.

Figure 1B:
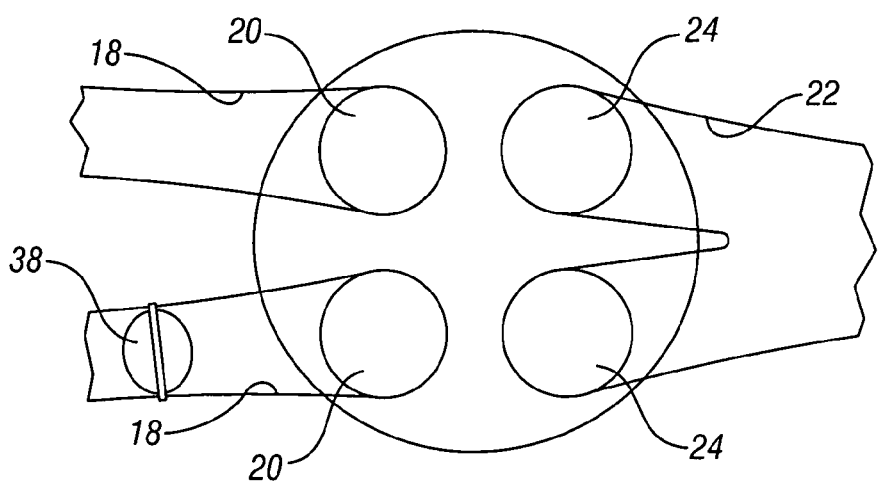
FIG. 1B is a top schematic view showing the valve arrangement of the engine of FIG. 1A.

FIG. 1A also shows a flow control valve 38 according to the method of present invention. It is located inside one branch of the intake runners 18 for a two-intake-valve per cylinder engine (see FIG. 1B). An existing swirl control valve that was previously used for in-cylinder air motion control in a stratified-charge gasoline direct-injection spark ignition engine is used herein for example to demonstrate the effectiveness of the present invention. Closing the flow control valve 38 by way of example provides a reservoir chamber inside the intake passage 18 between the flow control valve 38 and the intake valve 20.

Figure 2:
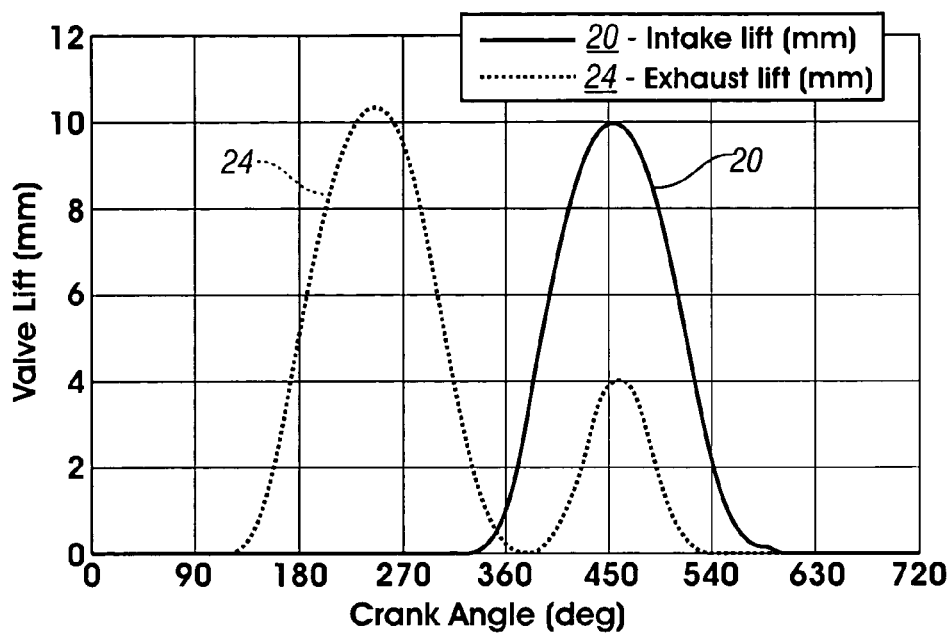
FIG. 2 is a graph of valve lift profiles as a function of crank angle for exhaust and intake valves of a four-stroke controlled auto-ignition combustion engine operating with an exhaust re-breathing valve strategy via use of a mechanical cam-actuated valve system.

Control of the motion of the intake valve 20 and exhaust valve 24 in accordance with an exhaust re-breathing valve strategy is illustrated in FIG. 2 for a four-stroke controlled auto-ignition combustion engine 10 using a mechanical cam-actuated valve system. In the figure, the exhaust valve 24 is opened twice during 720 degrees rotation of the crankshaft 30, i.e. one engine cycle. During the first period of opening, combusted gases are expelled from the combustion chamber 16 to the exhaust passage 22. During the second period of opening, previously exhausted combusted gases are drawn back into the combustion chamber 16 from the exhaust passage 22 at the same time as air or fuel/air charge is drawn into the combustion chamber 16 through the inlet passage 18. Thus, mixing of combusted gases and air or fuel/air charge is achieved and promotes the correct conditions for auto-ignition.

Auto-ignition of the mixture of combusted gases, air and either premixed or direct-injected fuel occurs after compression of the mixture during the compression stroke. The combustion of the mixture then causes the gases to expand in the power stroke. The four-stroke cycle then starts again. In particular, for the engine operating conditions examined, the exhaust valve 24 is opened for the first time during an engine cycle at roughly 60 degrees before bottom dead center at the end of the expansion stroke. The exhaust valve 24 is then closed for the first time near the end of the exhaust stroke. The intake valve 20 is opened before the end of the exhaust stroke and the exhaust valve 24 is re-opened about 30 degrees after the end of the exhaust stroke. The exhaust valve 24 is closed again near the end of the intake stroke while the intake valve 20 is closed approximately 60 degrees after the end of the intake stroke.

Figure 3:
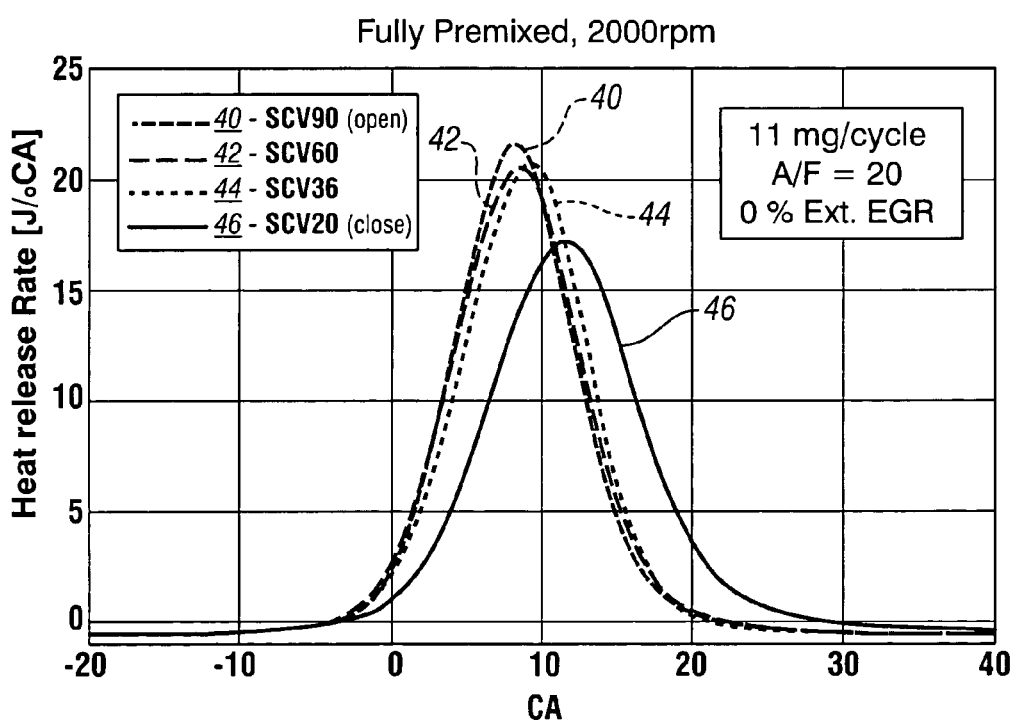
FIG. 3 is a graph of variations in heat release rate as a function of flow control valve setting using an exhaust re-breathing valve strategy at 2000 rpm, 11 mg/cycle, and A/F=20 for fully premixed engine operation.

FIG. 3 shows variations in heat release rate as a function of flow control valve setting using an exhaust re-breathing valve strategy at 2000 rpm, 11 mg/cycle, and A/F=20 for fully premixed engine operation. It is clear from the figure that the heat release rate is sensitive to flow control valve settings. In particular, the onset of ignition is more retarded and burn duration is much increased when the flow control valve 38 is closed.

Two hypotheses were proposed as to what causes later and slower combustion when the flow control valve is closed: 1) Increased heat loss due to intensified charge motion with flow control valve 38 closed; and 2) charge storage in the SCV port during a compression stroke and subsequent re-induction into the cylinder during the intake stroke of next cycle.

Figure 4A:
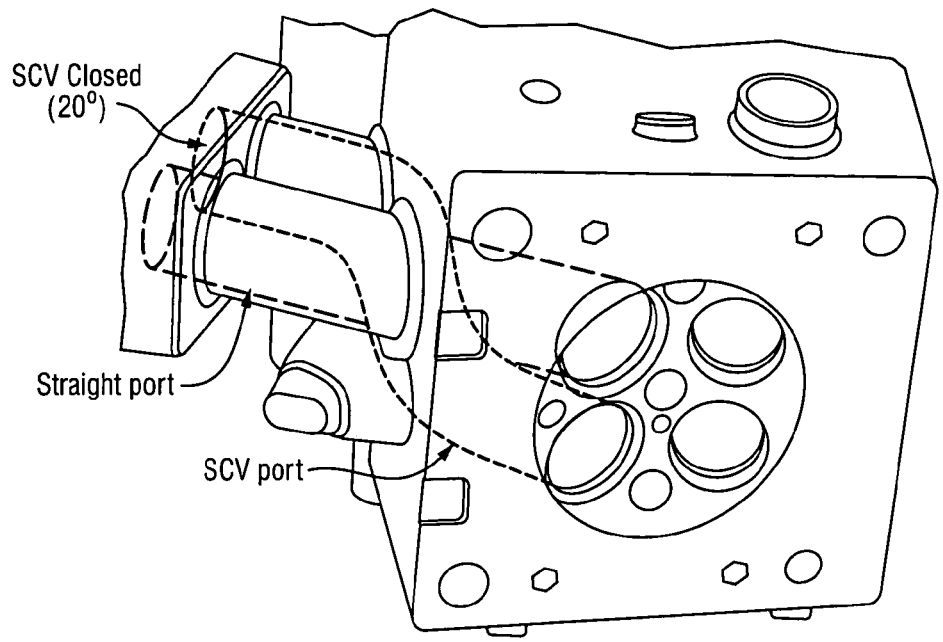
FIG. 4A illustrates a port deactivation intake configuration achieved by closing the flow control valve.
Figure 4B:
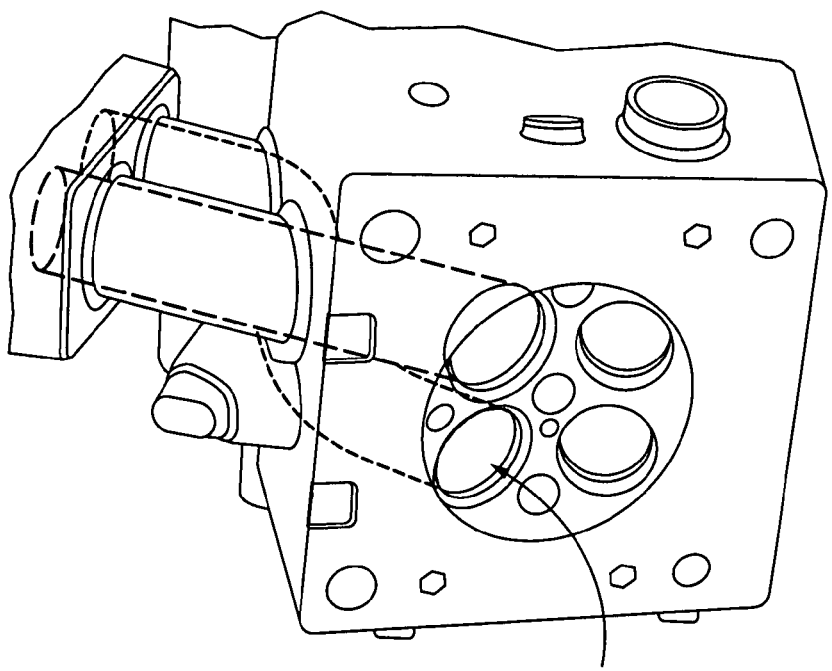
FIG. 4B illustrates an intake valve deactivation intake configuration achieved by removing the finger follower of the intake valve connecting to the SCV port.

As shown in FIGS. 4A and 4B, two hardware configurations were examined to address the issue. FIG. 4A shows a port deactivation configuration, achieved by closing the flow control valve 38; and FIG. 4B shows a valve deactivation configuration, achieved by removing the finger follower of the intake valve 20 controlling communication with the SCV port.

Figure 5:
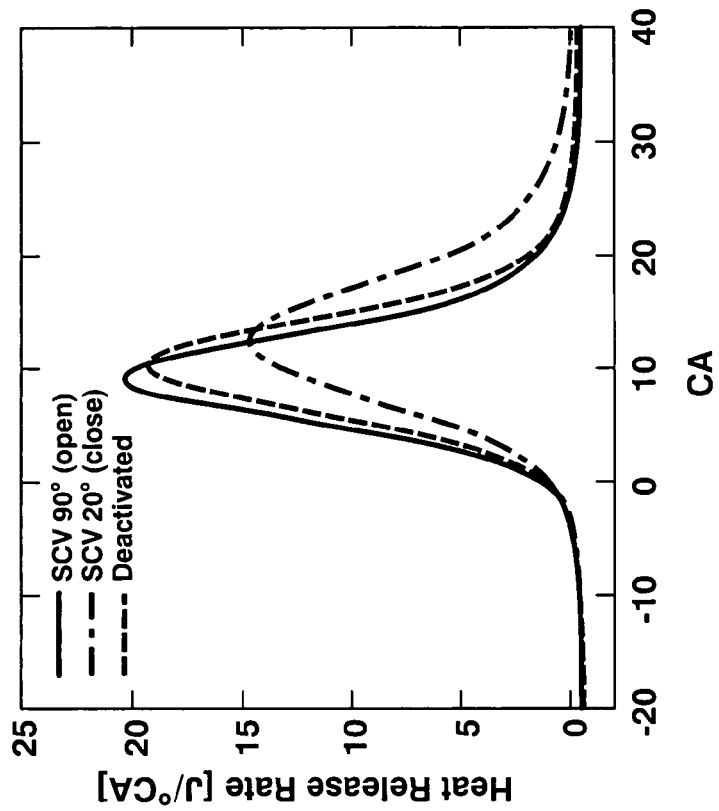
FIG. 5 shows graphs of variations in heat release rate for the two intake configurations shown in FIG. 4 together with the SCV open case for both fully premixed and direct-injection engine operations at 2000 rpm, 11 mg/cycle, and A/F=20.
Figure 5:
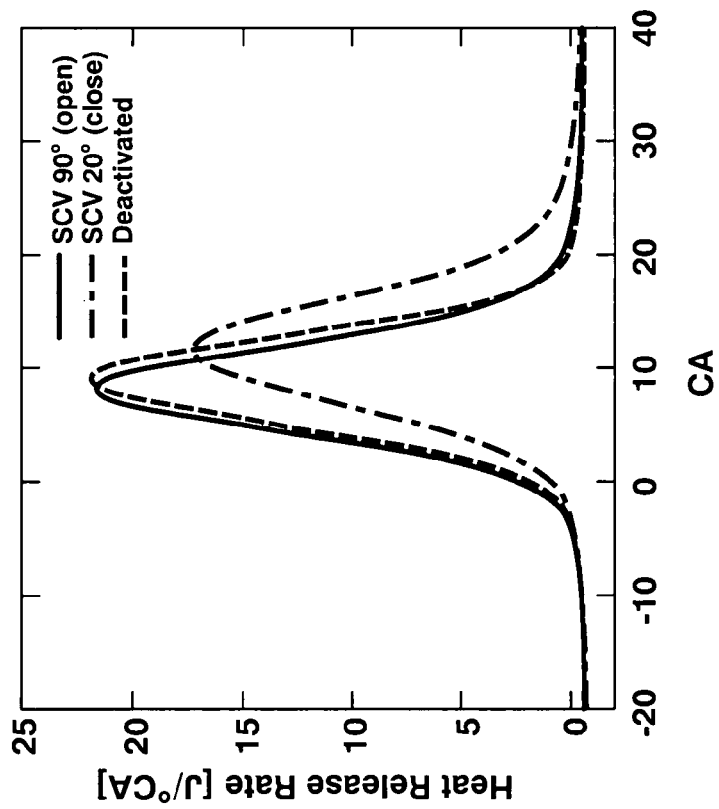

FIG. 5 shows variations in heat release rate for the two intake configurations shown in FIGS. 4A and 4B together with the SCV open case for both fully premixed and direct-injection engine operations at 2000 rpm, 11 mg/cycle, and A/F=20. The following is clear from the figure. 1) The burn rates are identical between the case with the flow control valve 38 open (SCV 90) and the case with one intake valve 20 deactivated. This finding eliminates the first hypothesis from further consideration since the in-cylinder charge motion varies greatly between the two intake configurations. 2) The fact that the burn rates are very different between port deactivation (SCV 20) and one intake valve 20 deactivated points towards a charge storage effect in the SCV port. To fully understand the charge storage effect in the intake port, a one-dimensional gas dynamic engine cycle simulation program was used to calculate flows in and out of the engine cylinders.

Figure 6:
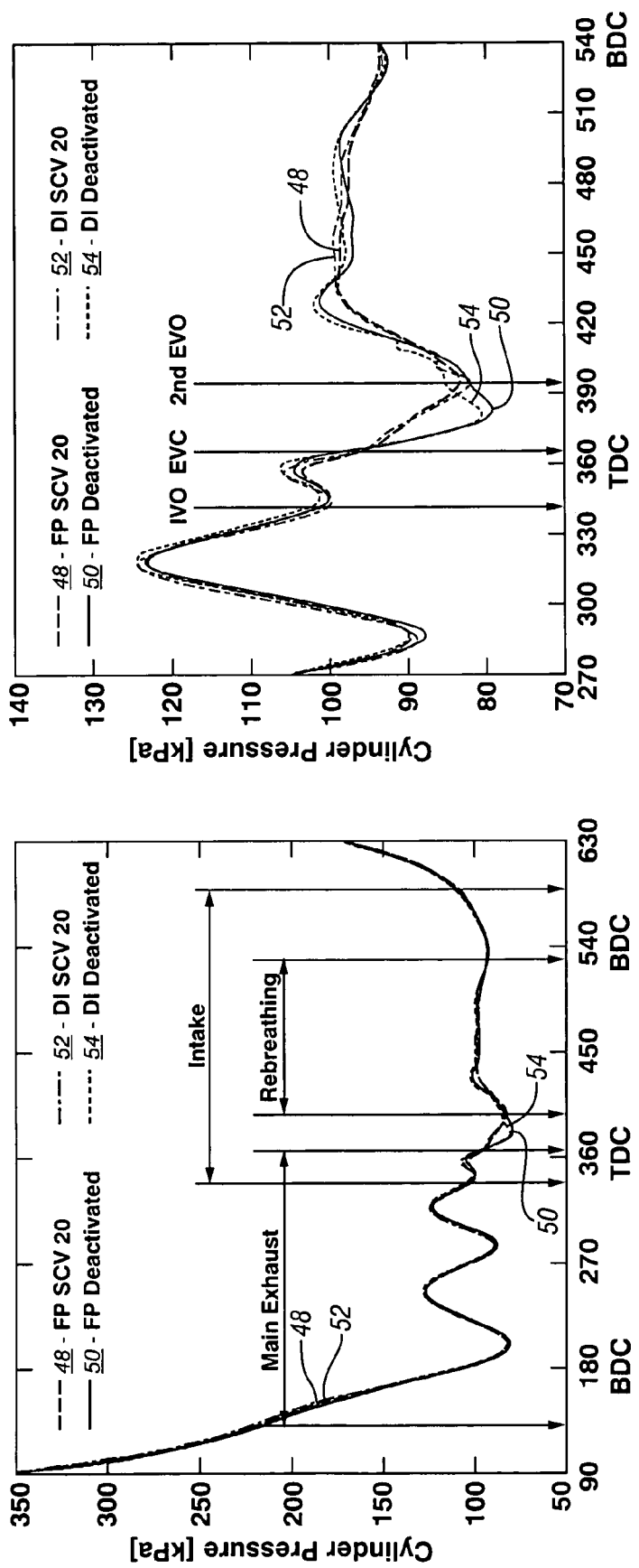
FIG. 6 shows graphs of variations in measured cylinder pressure during the gas exchange period for the two intake configurations shown in FIG. 4 for both fully premixed and direct-injection engine operations at 2000 rpm, 11 mg/cycle, and A/F=20.

FIG. 6 shows variations in measured cylinder pressure during the gas exchange period for the two intake configurations shown in FIGS. 4A and 4B for both fully premixed and direct-injection engine operations at 2000 rpm, 11 mg/cycle, and A/F=20. These data are used for one-dimensional gas dynamic model validation.

Figure 7:
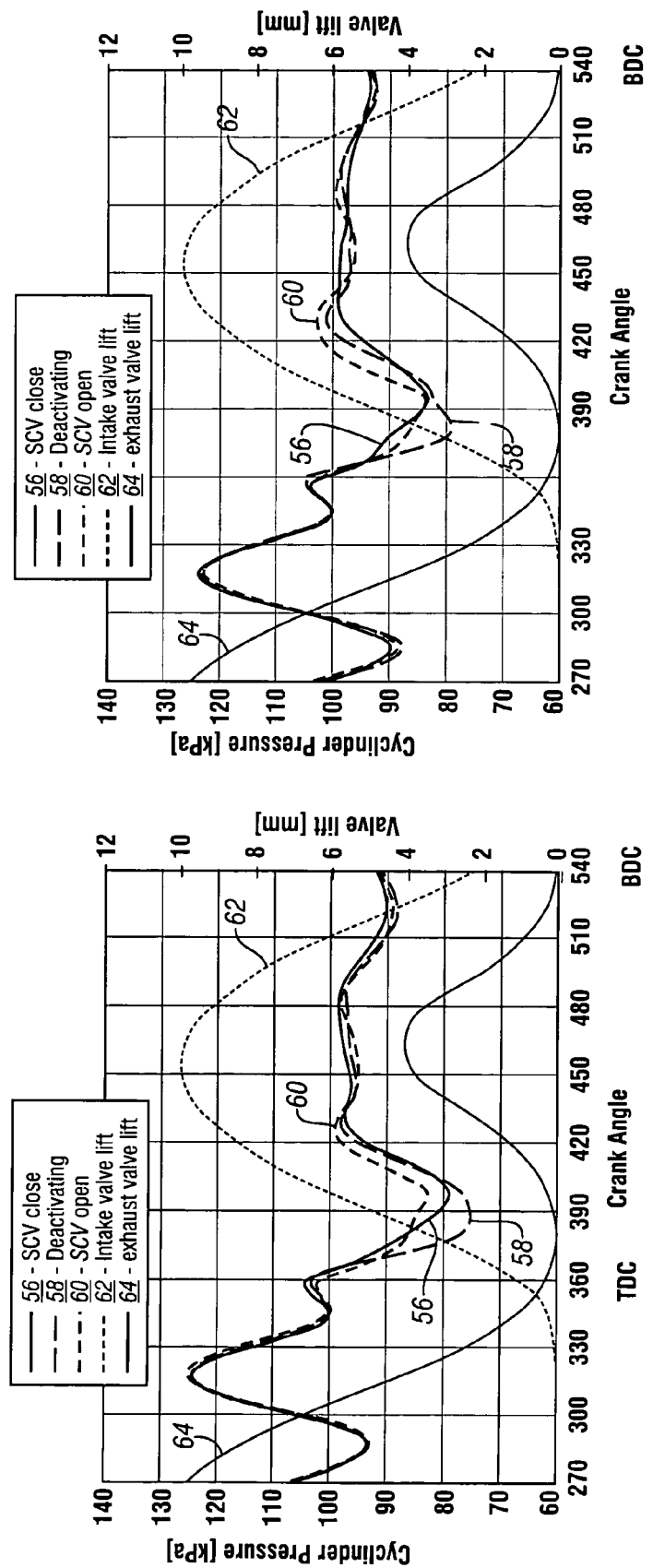
FIG. 7 shows graphs of variations in measured (experiment) and calculated (1-D modeling) cylinder pressure during the gas exchange period for the three intake configurations examined together with the valve lift profiles for both fully premixed and direct-injection engine operations at 2000 rpm, 11 mg/cycle, and A/F=20.

FIG. 7 shows variations in measured (experimental) and calculated (one-dimensional modeling) cylinder pressure during the gas exchange period for the three intake configurations examined together with the valve lift profiles for both fully premixed and direct-injection engine operations at 2000 rpm, 11 mg/cycle, and A/F=20. It is clear from the figure that agreement between measured and one-dimensional gas dynamic model calculated cylinder pressures is extremely good.

Figure 8:
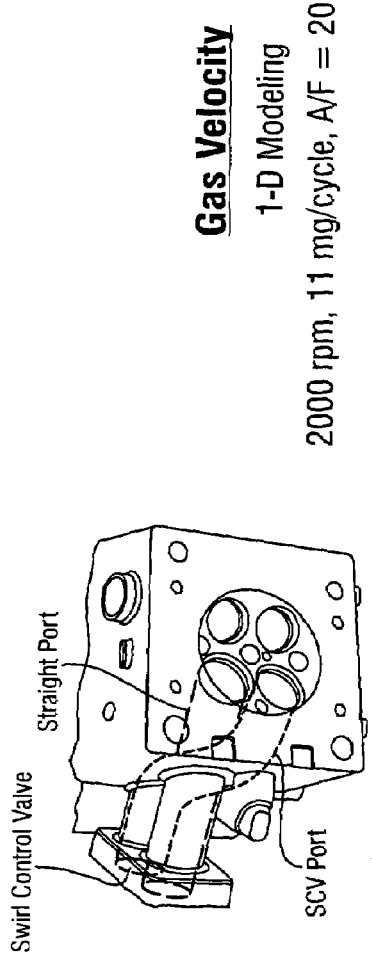
FIG. 8 shows graphs of calculated (1-D modeling) gas velocity in both SCV and straight intake ports 2 cm upstream of the respective intake valves during the gas exchange period for the three intake configurations examined together with the valve lift profiles for engine operations at 2000 rpm, 11 mg/cycle, and A/F=20.
Figure 8:
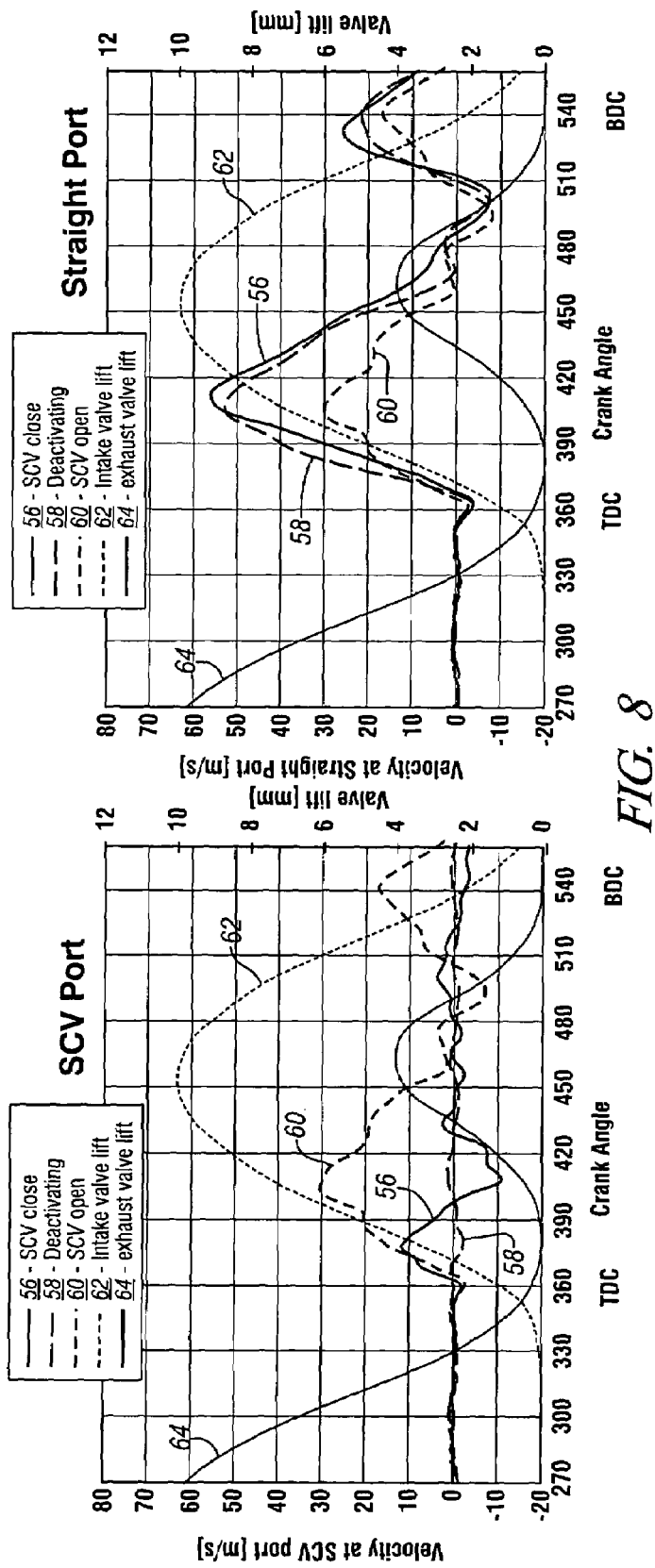

FIG. 8 shows calculated (one-dimensional modeling) gas velocity in both SCV and straight intake ports 2 cm upstream of the respective intake valves 20 during the gas exchange period for the three intake configurations examined together with the valve lift profiles for engine operations at 2000 rpm, 11 mg/cycle, and A/F=20.

Figure 9:
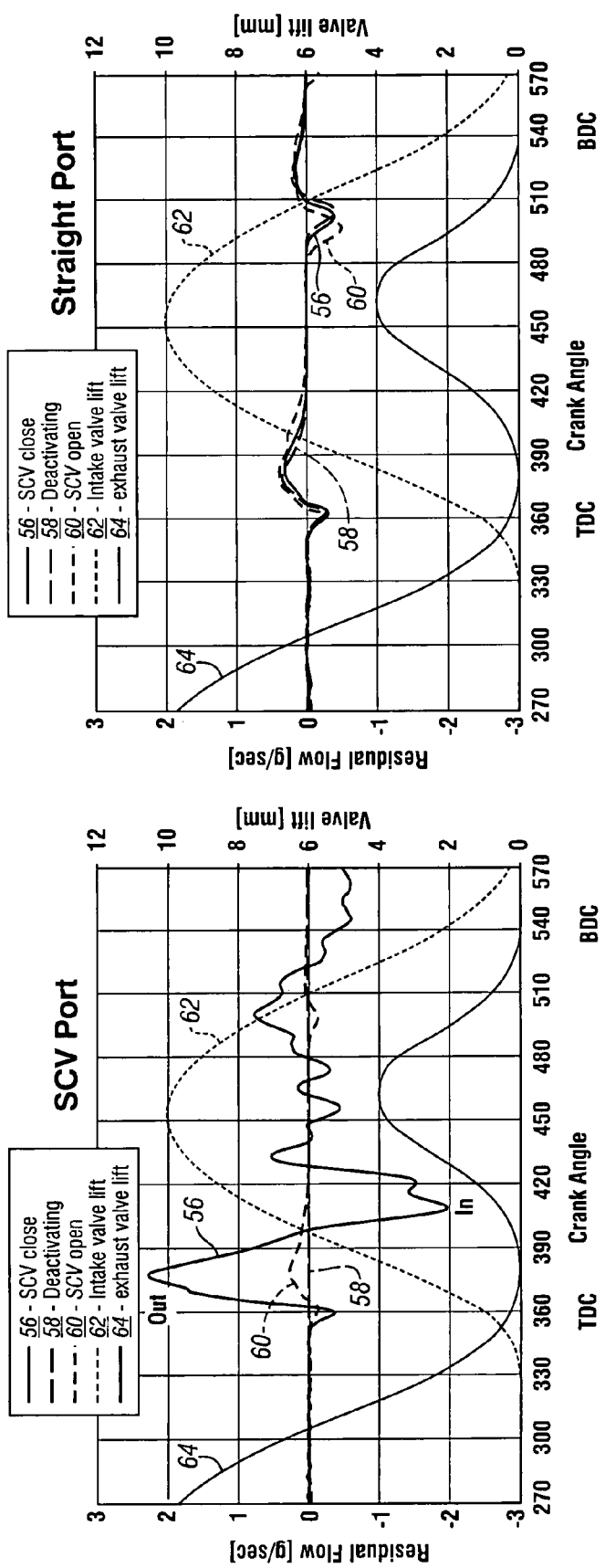
FIG. 9 shows graphs of calculated (1-D modeling) residual flow rate in both SCV and straight intake ports 2 cm upstream of the respective intake valves during the gas exchange period for the three intake configurations examined together with the valve lift profiles for engine operations at 2000 rpm, 11 mg/cycle, and A/F=20.

FIG. 9 shows calculated (one-dimensional modeling) residual flow rate in both SCV and straight intake ports 2 cm upstream of the respective intake valves 20 during the gas exchange period for the three intake configurations examined together with the valve lift profiles for engine operations at 2000 rpm, 11 mg/cycle, and A/F=20.

Figure 10:
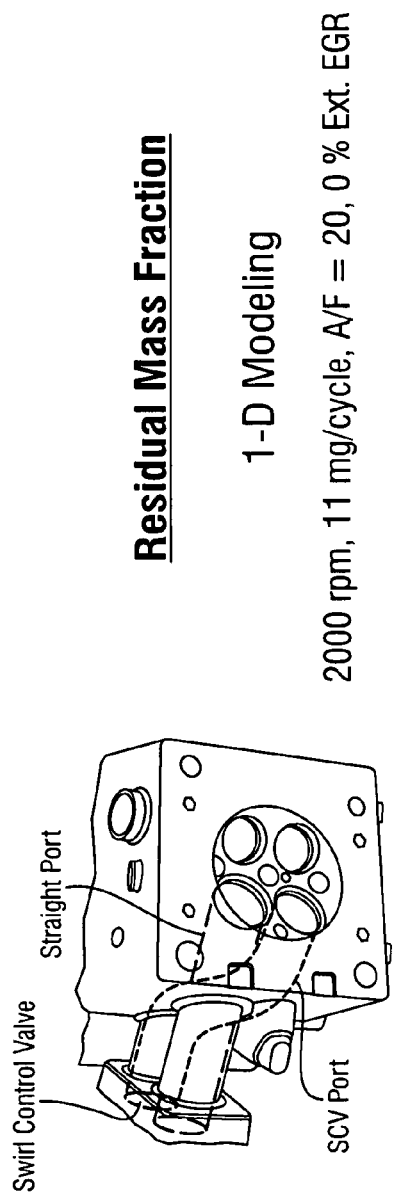
FIG. 10 shows graphs of calculated (1-D modeling) mass fraction of residual in both SCV and straight intake ports 2 cm upstream of the respective intake valves during the gas exchange period for the three intake configurations examined together with the valve lift profiles for engine operations at 2000 rpm, 11 mg/cycle, and A/F=20.
Figure 10:
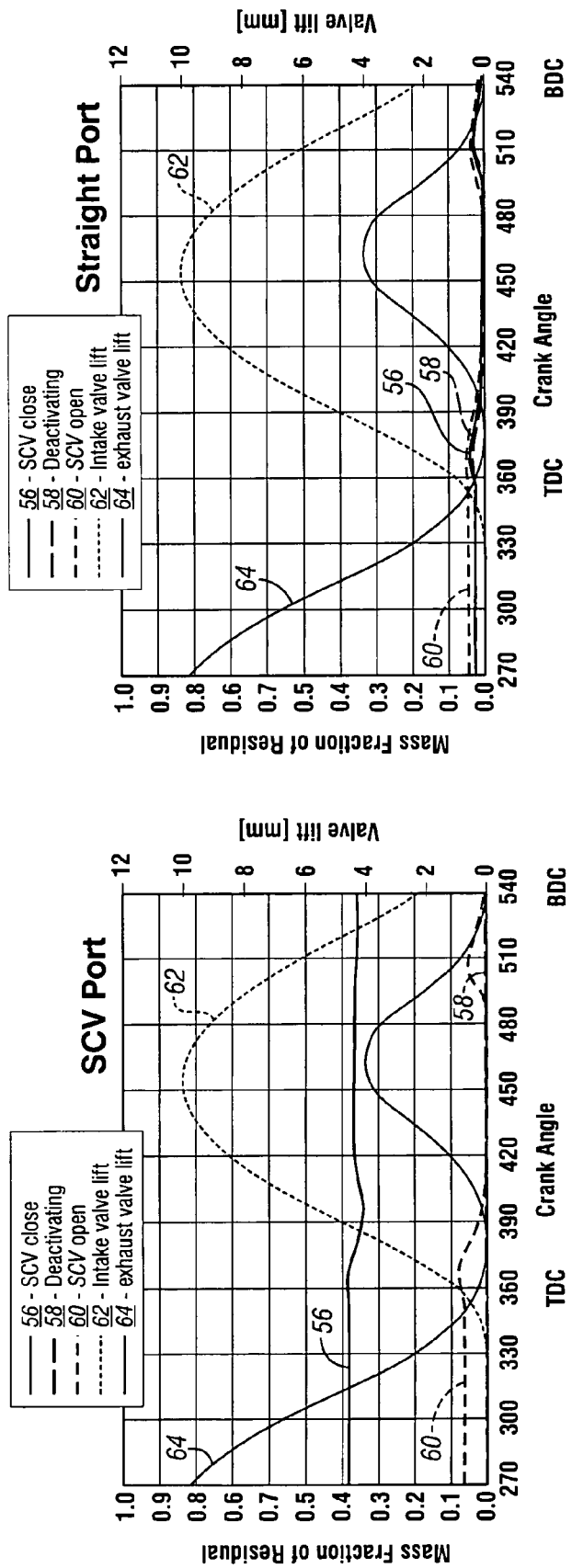

FIG. 10 shows calculated (one-dimensional modeling) mass fraction of residual in both SCV and straight intake ports 2 cm upstream of the respective intake valves 20 during the gas exchange period for the three intake configurations examined together with the valve lift profiles for engine operations at 2000 rpm, 11 mg/cycle, and A/F=20.

Figure 11:
FIG. 11 shows graphs of calculated (1-D modeling) gas temperature in both SCV and straight intake ports 2 cm upstream of the respective intake valves during the gas exchange period for the three intake configurations examined together with the valve lift profiles for engine operations at 2000 rpm, 11 mg/cycle, and A/F=20.
Figure 11:
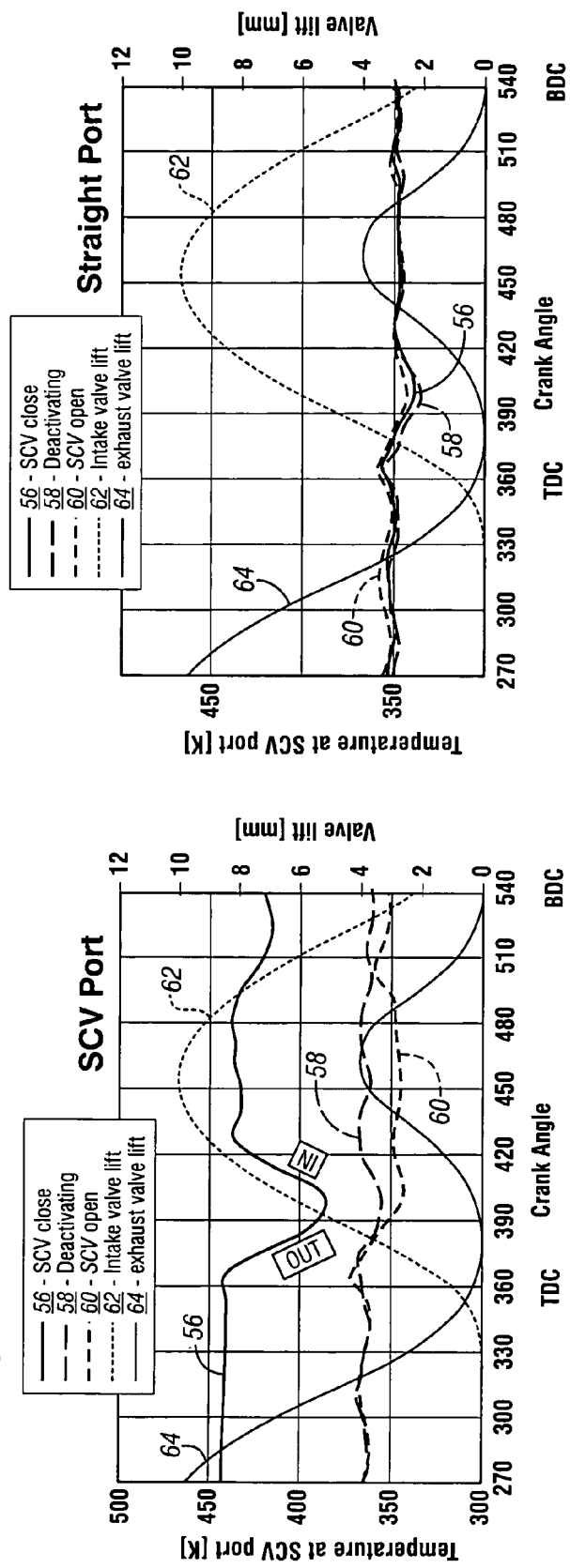

FIG. 11 shows calculated (one-dimensional modeling) gas temperature in both SCV and straight intake ports 2 cm upstream of the respective intake valves 20 during the gas exchange period for the three intake configurations examined together with the valve lift profiles for engine operations at 2000 rpm, 11 mg/cycle, and A/F=20.

One-dimensional modeling results presented in FIGS. 8–11 show the following. 1) The charge trapped in the SCV port has an average residual mass fraction around 38% (left graph of FIG. 10). 2) After intake valve opening, this trapped charge flows out of the SCV port into the combustion chamber (left graph of FIG. 9). 3) The temperature of this trapped charge is between 390 and 440 degree K (left graph of FIG. 11). This is about 300 degree K lower than the gas temperature in the exhaust port (as noted in FIG. 11). 4) When the exhaust valve 24 is re-opened around 390 degree ATDC combustion, the SCV port is re-charged with hotter gas from the cylinder 14 and the exhaust port. This storage and discharge of residual gas in the SCV port resulted in an overall reduction of in-cylinder mean charge temperature at the time of intake valve closing as compared to the cases with SCV open and one intake valve 20 deactivated. This causes retarded ignition timing shown in FIG. 3 for the SCV closed case.

Figure 12:
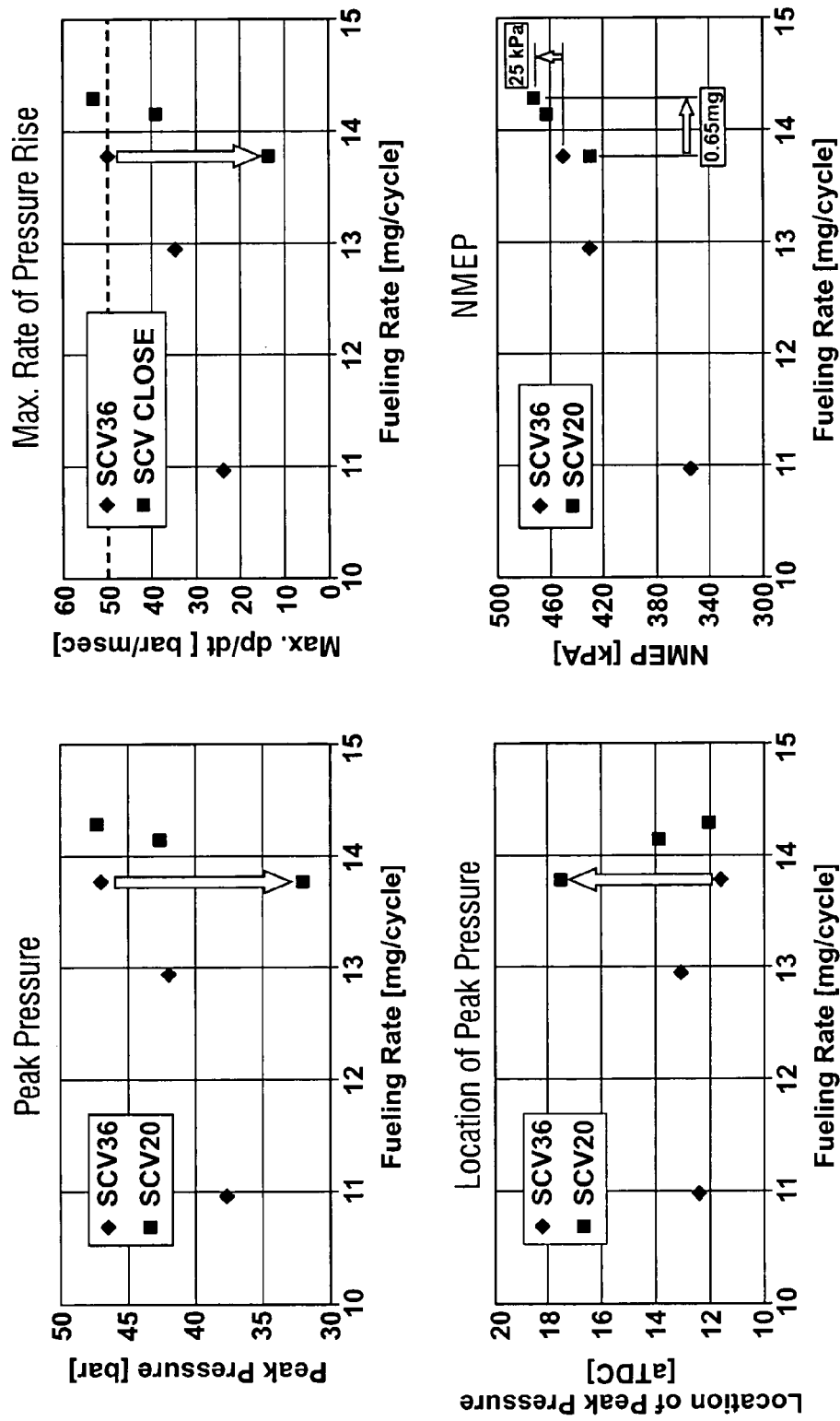
FIG. 12 shows graphs of measured combustion performance as a function of fueling rate for two SCV settings (36 vs. 20 deg) at 2000 rpm and A/F=20 for direct-injection engine operation.

FIG. 12 shows measured combustion performance as a function of fueling rate for two SCV settings (36 vs. 20 degrees) at 2000 rpm and A/F=20 for direct-injection engine operation. When the SCV setting is set at 36 degrees, both peak pressure and maximum rate of pressure rise increase with increasing fueling rate (top plots of FIG. 12). At a fueling rate of 13.75 mg/cycle, this corresponds to a load of 450 kPa NMEP, and the maximum rate of pressure rise reaches the limit of 50 bar/msec. By closing the SCV valve, both peak pressure and maximum rate of pressure rise are greatly reduced. The crank angle location of peak pressure is also retarded. This allows for addition of an additional 0.65 mg of fuel (about 25 kPa NMEP load) to the engine 10 before exceeding the maximum rate of pressure rise limit again. The mid load operation limit is thereby extended by about 5 percent.

Figure 13:
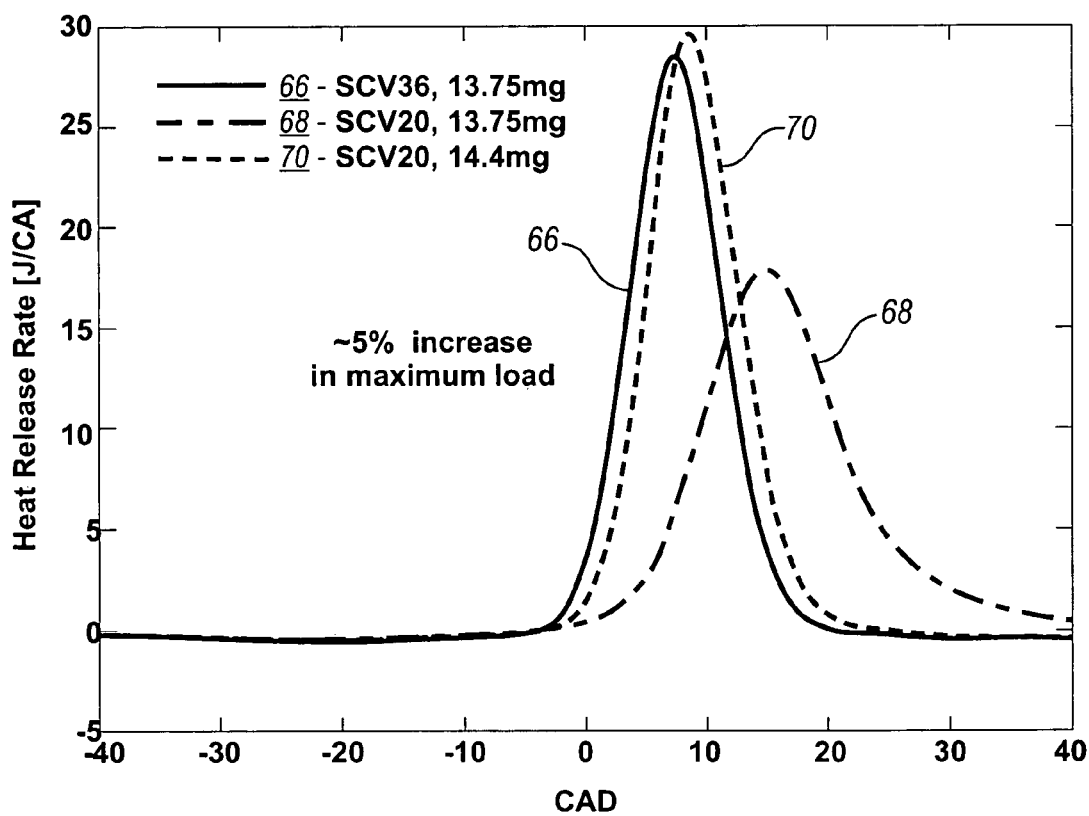
FIG. 13 is a graph of variations in heat release rate as a function of flow control valve setting and fueling rate at 2000 rpm and A/F=20 for direct-injection engine operation.

FIG. 13 shows variations in heat release rate as a function of flow control valve setting and fueling rate at 2000 rpm and A/F=20 for direct-injection engine operation. The figure further illustrates the effects of flow control valve setting and fueling rate on controlled auto-ignition combustion rate.

The present invention applies to other engine speeds and valve strategies as well, although the effectiveness of port throttle on residual gas heat rejection, and hence HCCI combustion, may vary. In particular, the present invention should be more effective at lower engine speed due to longer time available for heat dissipation. Further, any valve strategy that renders itself towards using the SCV port for storage and release of residual gas can benefit from present invention for mid load extension.

The present invention can be extended to include active thermal management in both the intake and exhaust ports. For example, coolant passages in the head can be designed so that wall temperatures of both the SCV and exhaust ports are controlled. This will help in regulating the temperature of recirculated burned gas for HCCI combustion especially in the mid load range.

The present invention applies equally well to both pre-mixed and direct-injection controlled auto-ignition combustion engines as demonstrated in the above embodiments.

While the intake valve 20 and exhaust valve 24 in the above embodiments are mechanically actuated, they could be actuated electro-hydraulically or electrically using electromagnetic force.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. A method for expanding the mid load range of a four-stroke gasoline direct-injection controlled auto-ignition (CAI) combustion engine having at least one cylinder with direct fuel injection and containing a piston reciprocably connected with a crank and defining a variable volume combustion chamber including an intake valve controlling communication with an air intake and an exhaust valve controlling communication with an exhaust outlet, the method comprising:

employing a variable valve actuating system for variably actuating the intake and exhaust valves and operating the intake and exhaust valves with at least one of an exhaust re-compression valve strategy and an exhaust re-breathing valve strategy;

providing a reservoir chamber in communication with said combustion chamber for temporary holding of residual burned gas; and operating the engine with CAI combustion during stable combustion in a mid-load operating range;

whereby residual burned gas in the combustion chamber and the exhaust outlet enters into said reservoir chamber and then loses thermal energy while in the reservoir chamber before being drawn back into the combustion chamber, thereby extending the mid-load operating range of stable CAI combustion.

2. The method of claim 1 wherein said reservoir chamber is a part of said air intake.

3. The method of claim 1, including the step of:
effecting the storage and discharge of residual burned gas in the reservoir chamber during combustion cycles of the engine.

4. The method of claim 1, including the step of:
providing active thermal management for both the reservoir chamber and the exhaust port.

5. A method for expanding the mid load range of a four-stroke gasoline direct-injection controlled auto-ignition combustion engine having at least one cylinder with direct fuel injection and containing a piston reciprocably connected with a crank and defining a variable volume combustion chamber including two intake valves controlling communication with an air intake having two intake passages, each intake valve controlling communication with one of the intake passages, and an exhaust valve controlling communication with an exhaust outlet, the method comprising:

employing a variable valve actuating system for variably actuating the intake and exhaust valves and operating the intake and exhaust valves with at least one of an exhaust re-compression valve strategy and an exhaust re-breathing valve strategy; and providing a flow control valve inside one of the intake passages of the air intake of each cylinder;

adjusting the flow control valve to a fully closed position;

whereby adjusting the flow control valve to a fully closed position creates a reservoir chamber defined by the flow control valve and the intake passage and intake valve, said reservoir chamber functioning as a temporary cooling chamber for residual burned gas present in the combustion chamber and the exhaust outlet; and operating the engine with CAI combustion during stable combustion in a mid-load operating range;

whereby residual burned gas in the combustion chamber and the exhaust outlet enters into said reservoir chamber and then loses thermal energy while in the reservoir chamber before being drawn back into the combustion chamber, thereby extending the mid-load operating range of stable CAI combustion.

6. The method of claim 5, including the step of: controlling the temperature of the reservoir chamber wall.

7. The method of claim 5, including the step of: controlling the temperature of the exhaust outlet wall.

8. The method of claim 5 including performing a partial opening of the exhaust valve and a larger opening of the intake valves during the piston intake stroke preceded by a normal opening of the exhaust valve during the piston exhaust stroke, and setting the timing of the intake and exhaust valves to discharge cooler residual burned gas from the reservoir chamber into the combustion chamber during initial opening of the intake valve and recharging the reservoir chamber with hotter residual burned gas from the combustion chamber, during the subsequent partial opening of the exhaust valve while the intake valve is open, for cooling and return to the combustion chamber upon initial opening of the intake valve during the following engine cycle.

* * * * *